Patented Dec. 6, 1949

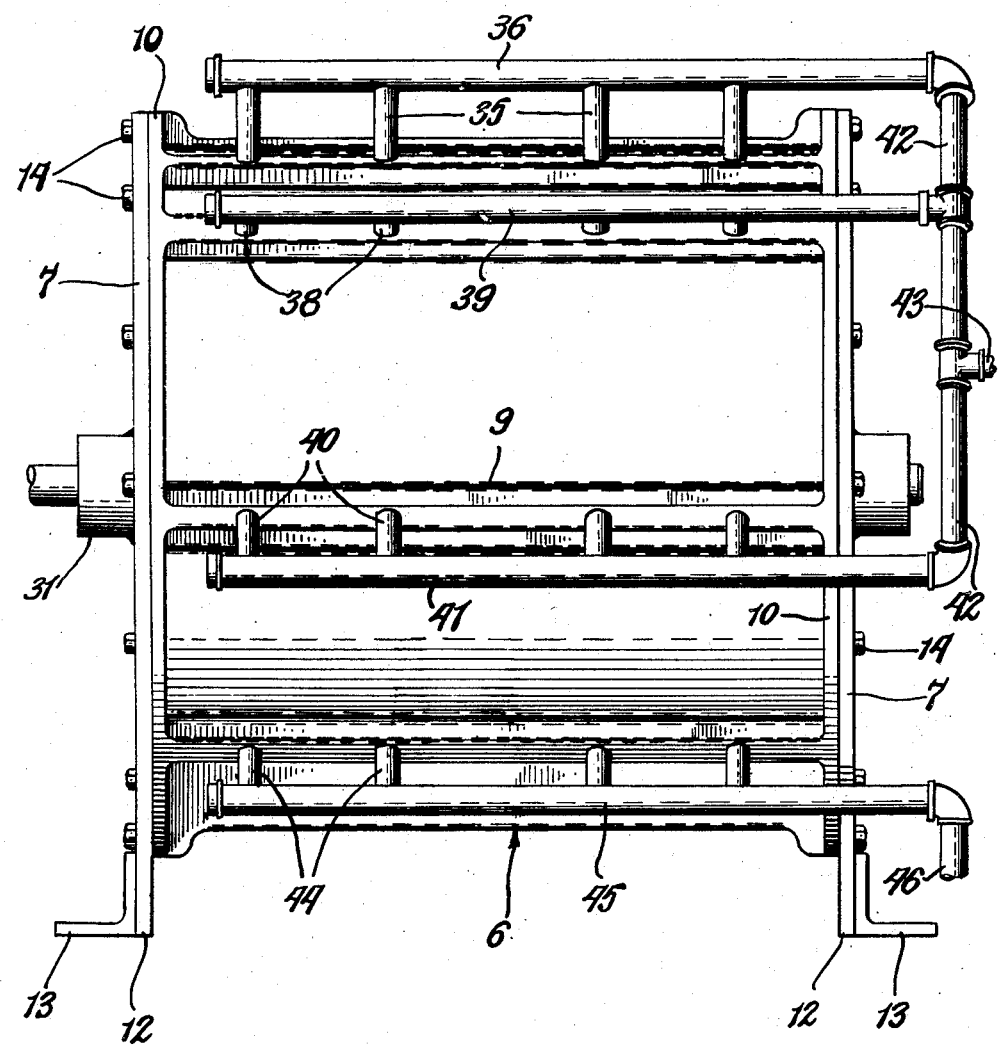

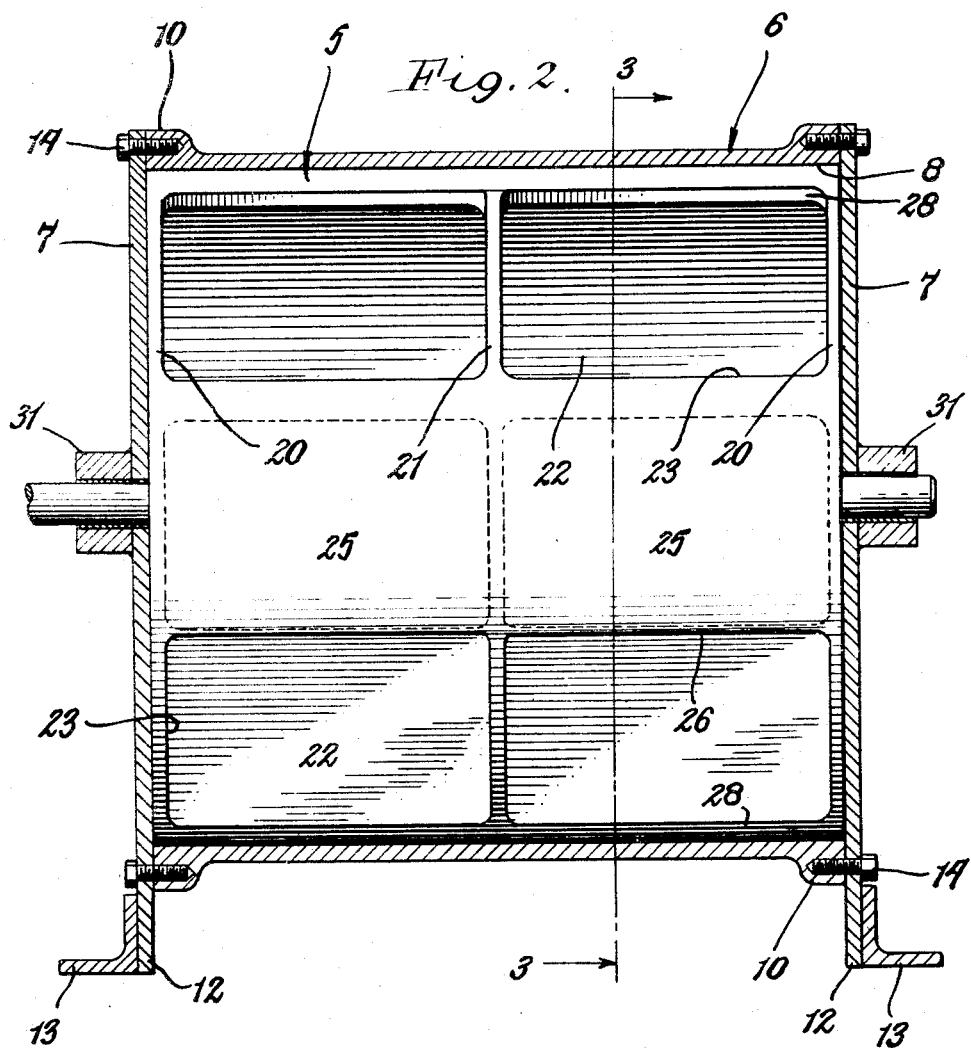

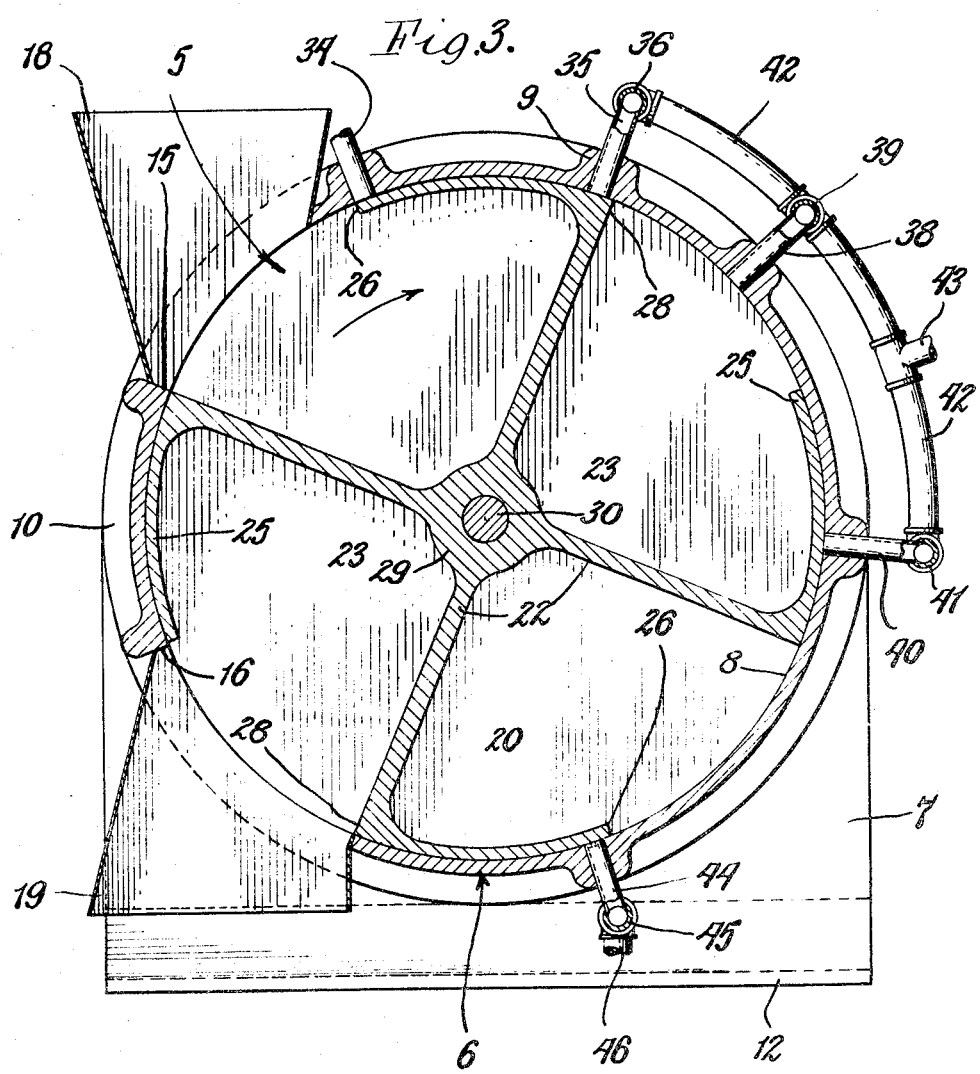

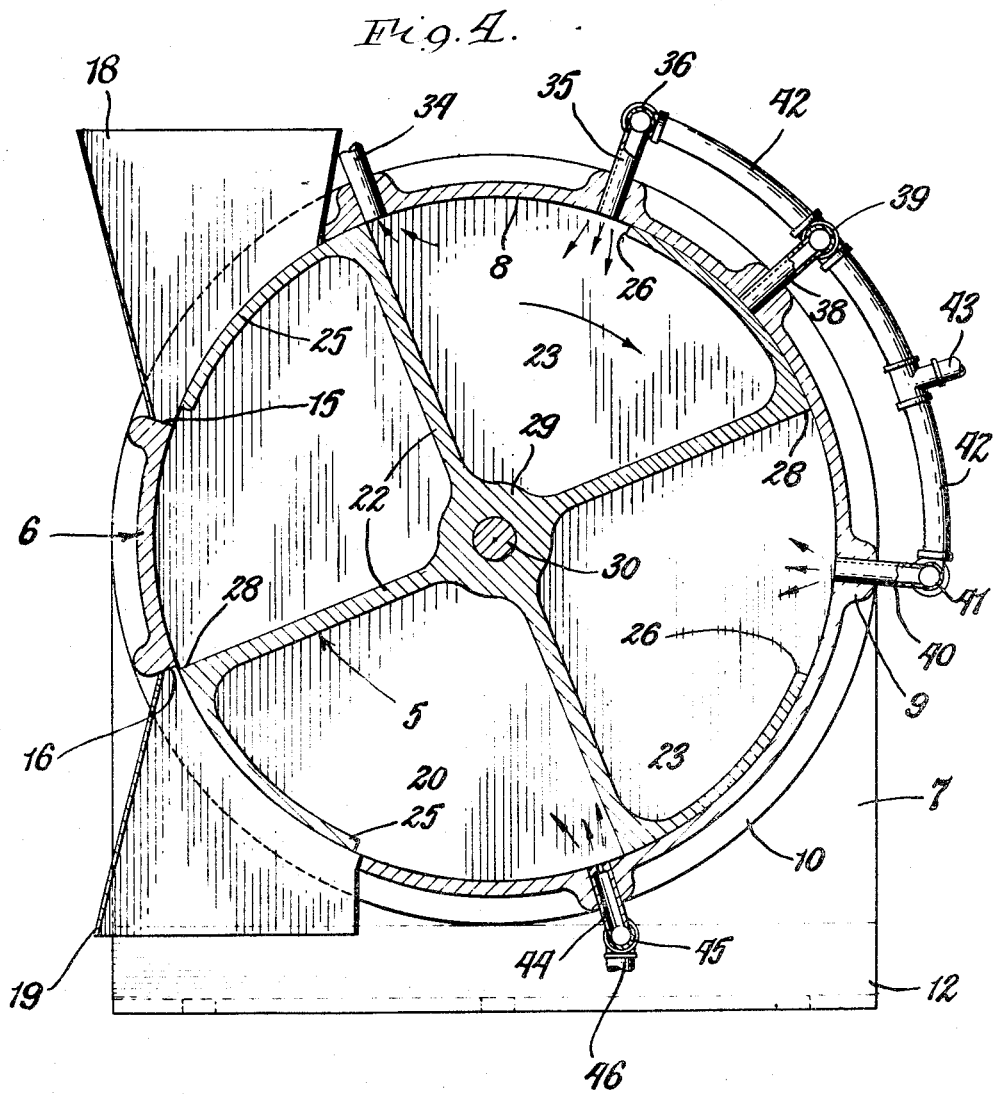

2,490,112

UNITED STATES PATENT OFFICE 2,490,112

APPARATUS FOR PEELING VEGETABLES AND FRUITS

Russell H. Winters, Green Bay, Wis., assignor to The Larsen Company, Green Bay, Wis.

Application July 23, 1946, Serial No. 685,709

4 Claims. (Cl. 146—48)

This invention relates to apparatus for peeling vegetables and fruit, particularly for such vegetables as carrots, onions, potatoes, rutabagas, beets, turnips and tomatoes, and such fruit as apples, in which the skin of such vegetables or fruit is exploded free from the body of the same by a sudden release of steam pressure developed under the skin.

This application is a continuation in part of my Patent No. 2,429,785, dated October 28, 1947 for Apparatus for peeling root vegetables and fruit.

In peeling vegetables, such as onions, potatoes, rutabagas, beets and turnips, as now practiced, a large portion of the body of the vegetable is removed with the skin, this proportion being from 20–26% of the body of the vegetable. This also applies to fruit, such as apples, which is similar in structure to such root vegetables in that they have tight, firm skins. This, of course, results in a direct waste of this proportion of the money and labor expended in planting, fertilizing, cultivating and harvesting these vegetables and fruit, as well as the cost and labor of transporting them to the cannery and preparing them for peeling. All of such vegetables and fruit have a distinct skin which is relatively thin compared to the whole vegetable or fruit and which is all that is required to be removed in order to place these vegetables and fruit in acceptable condition for cooking and canning, or otherwise preserving.

In common with my said co-pending application, the apparatus forming the subject of the present invention proposes to peel such fruit by exploding their skins free from their bodies by the sudden release of steam pressure developed under the skin. By so exploding the skins free from the vegetables and fruit a large saving of the edible body of the vegetable and fruit results; the peeled vegetables and fruit are all of better appearance and the vegetables and fruit also possesses extraordinary resistance to discoloration when exposed to the air, such discoloration or pigmentation being due to the presence of oxidative ferments or enzymes in the tissues and which are oxidized when exposed to the air.

In common with my said co-pending application, the principal objects of the present invention are to provide apparatus for removing the skins of vegetables and fruit, without removal of any substantial part of the bodies of these vegetables, thereby to materially reduce the cost of such vegetables and fruit in canning or otherwise preserving the same; in the operation of which that part of the skin which forms irregularities such as creases or eyes are completely removed with the skin; which is operated as a continuous process; which can be used with fresh vegetables or fruit which have been in storage; which is low in cost; does not require a highly skilled operator; which does not cook the vegetables or fruit or otherwise alter the taste or appearance thereof; and which leaves the product in a clean and entirely acceptable condition for slicing, dicing, canning in whole form, or otherwise processing preliminary to being filled into cans or otherwise preserving the same.

A specific object of the present invention is to provide such apparatus which is of high capacity and in which the working chambers can be rapidly filled and rapidly emptied.

Another specific object is to provide such apparatus in which the entire skin is removed from each of the vegetables or fruit in each batch being processed. In particular, the present invention provides a tumbling action which insures all parts of the fruit or vegetables being exposed to an elevated temperature so that untreated spots do not develop, the skin at such untreated spots not exploding from the body of the fruit or vegetables and hence requiring subsequent inspection and hand removal.

Another specific object is to provide such apparatus which is adequately protected against leakage, such leakage being the escape of steam during the pressure treatment and ingress of air during vacuum treatment.

Another object is to provide such apparatus having large inlet openings to the treating chambers so that the same can be rapidly filled and rapidly emptied.

In the accompanying drawings:

Fig. 1 is a side elevation of the apparatus embodying the present invention for peeling vegetables and fruit.

Fig. 2 is a vertical longitudinal central section therethrough and showing the rotor in elevation.

Fig. 3 is a vertical transverse section taken on the line 3—3, Fig. 2, and showing one position of the parts.

Fig. 4 is a view similar to Fig. 3 and showing another position of the parts.

In general the apparatus forming the subject of the present invention comprises a horizontal cylinder having end heads and housing a cylindrical rotor closely fitting the cylinder and end heads. This rotor is chambered and each chamber is provided with a large opening which opens through the periphery of the rotor and successively registers with intake and outlet openings in the cylinder through which the vegetables or fruit are fed to and removed from the rotor chambers by gravity. Each chamber, after being filled, successively traverses vent steam and water spray ports in the cylinder before encountering the outlet opening, the chamber being first filled with steam at a pressure to raise the temperature of the moisture under the skin of the vegetables or fruit to a temperature corresponding to the steam pressure and the steam being thereafter condensed by the water sprays to build up a vacuum in the chamber and to cause vaporization of the moisture under the skin of the vegetables and fruit and to explode the skin therefrom. By arranging the rotor on a horizontal axis the chambers are inverted during the steam pressure treatment, thereby to tumble the vegetables or fruit around and to prevent the occurrence of spots on the vegetables or fruit, which, through continued contact with one another, prevent the raising of the temperature of the subcutaneous moisture as required for removal of the skin during the vacuum phase of the process such undertreated spots, of course, would require subsequent inspection and hand removal.

The form of the invention is illustrated in the accompanying drawings, with the chambered rotor indicated generally at 5, its enclosing cylinder at 6 and the end heads at 7, the enclosing cylinder 6 and heads 7 forming a cylindrical compartment 8 in which the rotor 5 is fitted with comparatively close tolerances so as to avoid leakage as hereinafter described.

The enclosing cylinder 6 is shown as provided with longitudinal strengthening ribs 9 and also as provided with outwardly extending annular end flanges or beads 10. The end heads 7 can be of any suitable form and are shown as being of semi-circular form so as to provide standards 12 which can be secured to the floor, or other support on which the apparatus is mounted, by angle irons 13 or in any other suitable manner. These end heads can be secured to the enclosing cylinder 6 in any suitable manner as by the screws 14 which extend through these end head into the beads or flanges 10 of the enclosing cylinder as best shown in Fig. 2.

The enclosing cylinder 6 is shown as provided in its upper left quarter, as viewed in Fig. 3, with an inlet opening 15 and as provided in its lower left quarter with an outlet opening 16, the chambered rotor 5 rotating clockwise as viewed in this figure. Each of these openings, 15, 16 extends substantially the full length of the enclosing cylinder 6 and also is of substantial extend circumferentially of the cylinder. Thus, the inlet opening 15 is shown as extending from approximately the ten o'clock to the eleven o'clock position, as viewed in Fig. 3, and the outlet opening 16 is shown as extending from approximately the seven o'clock to the eight o'clock position as viewed in Fig. 3. The inlet and outlet openings 15, 16 are preferably and substantially in vertical alinement and the enclosing cylinder 6 is shown as provided with an inlet hopper 18 leading to the inlet opening 15 and with a discharge spout 19 leading from the discharge opening 16.

The rotor 5 is shown as being in the form of a casting having circular end disks 20 which are closely fitted to the end heads 7 and also closely fitted to the bore of the enclosing cylinder 6, a central disk or partition 21 which is closely fitted to the bore of the enclosing cylinder 6 and a series of longitudinal partitions or walls 22 which extend lengthwise of the rotor between the end disks 20 and central partition or disk 21 and are arranged in equally spaced relation around the rotor so as to provide a series of compartments or chambers 23 in the rotor. In the rotor shown, four such walls or partitions 22 are provided between the central partition or disk 21 and each of the end disks 20, thereby to provide eight compartments 23, four of the compartments being arranged at each end of the rotor.

To provide an adequate seal between the compartments and also to render the rotor self-valving in controlling the admission of a charge of fruit or vegetables to each chamber 23; the subsequent venting thereof and the introduction of steam under pressure; the subsequent spraying of cold water thereon to condense the steam and create the necessary vacuum; and the subsequent discharge of the peeled fruit or vegetables therefrom, each chamber 23 is partly enclosed by a curved wall 25 which extends counterclockwise, as shown in Fig. 3, from the corresponding partition or wall 22 and the outer surface of which is closely fitted to the bore of the enclosing cylinder 6. These curved walls 25 are integrally joined at their ends with the end and central disks 20, 21 of the rotor and the trailing edge 26 of each of the curved walls 25 terminates at approximately the center of a corresponding compartment 23 so as to provide an inlet opening 28 for each compartment through the periphery of the rotor 5. It will therefore be seen that each compartment 23 is provided with a generally rectangular opening 28 which extends the full length thereof and approximately half the circumferential width thereof, these openings 28 being preferably of somewhat greater circumferential extent than the inlet openings 15, but being substantially equal to the discharge opening 16.

The rotor 5 is formed at its center to provide a core 29 in which is fixed a drive shaft 30. This drive shaft is journaled in bearings 31 of the end heads 7 and is continuously rotated to effect clockwise rotation of the rotor 5, as viewed in Fig. 3, at the desired speed for effecting peeling of the fruit or vegetables in the chamber 23 as hereinafter described.

The enclosing casing 6 is shown as provided immediately above its intake opening 15 with a longitudinal series of vent pipes 34, these vent pipes 34 serving to vent the passing compartments or chambers 23 on each side of the apparatus and being at approximately the eleven o'clock position shown in Fig. 3. At approximately the one o'clock position, as viewed in Fig. 3, the enclosing cylinder 6 is provided with a longitudinal series of steam pipes 35 extending therethrough, these steam pipes being connected by a manifold 36 extending longitudinally of the apparatus and the steam pipes 35 opening into the interior of the enclosing cylinder 6. A similar series of steam pipes 38 supplied by a manifold 39 are provided at approximately the two o'clock position, as viewed in Fig. 3, and a third series of similar steam pipes 40 provided with a manifold 41 are provided at approximately the three o'clock position along the enclosing cylinder 6. The ends of the manifolds 36, 39 and 41 are inter-connected by steam pipes 42, these being supplied with steam under the desired pressure through a steam supply line 43.

At approximately the five o'clock position along the enclosing cylinder 6, as viewed in Fig. 3, a longitudinal series of water spray nozzles 44 are mounted in the cylinder to spray cold water into the passing compartments or chambers 23 on each side of the apparatus. These spray nozzles 44 are connected, externally of the enclosing cylinder 6, by a manifold 45, one end of which is connected to a cold water spray supply pipe 46.

In the operation of the apparatus the fruit or vegetables to be peeled are supplied to the inlet hopper 18, steam under the pressure required by the following table for the particular vegetables or fruit being processed is supplied to the steam supply pipes 43, 42, and thence through the manifolds 36, 39 and 41 to the steam pipes 35, 38 and 40. Likewise, cold water is supplied through the supply line 46 and manifold 45 to the nozzles 44. The rotor 5 is rotated, through its drive shaft 30, in a clockwise direction, as viewed in Figs. 3 and 4, the speed of rotation of this rotor being determined by the following table.

As each opening 28 for each compartment or chamber 23 passes the intake opening 26, a charge of the fruit or vegetables in the hopper 18 falls through this inlet opening so as to fill the pair of passing chambers 23 by gravity, this position of the parts being illustrated in Fig. 4. As the rotor 5 continues to rotate, this pair of filled chambers 23 are brought in communication with the vent pipes 34, this communication continuing until after the curved walls 25 of this pair of chambers pass beyond the first series of steam pipes 35. Before this occurs, the longitudinal walls or partitions 22 at the trailing sides of this pair of chambers, passes beyond the intake opening 15 so that this pair of chambers 23 is in communication only with the steam pipes 35 and the vent pipes 34. This position of the parts is illustrated in Fig. 3 and it will be seen that in this position this pair of chambers 23, which are now uppermost, are being supplied with steam and at the same time vented so that the air present in these chambers is being driven out and steam substituted therefor.

As soon as the longitudinal walls or partitions 22 on the trailing sides of this pair of chambers 23 passes beyond the vent pipes 34, the steam supplied by the steam pipes 35 builds up a steam pressure in this pair of chambers corresponding to the pressure of the steam supplied. This steam pressure is maintained in this pair of chambers 23 as the peripheral openings 28 thereof successively traverse the three series of steam pipes 35, 38 and 40. Accordingly, steam pressure is built up in each pair of chambers 23 from the time the longitudinal walls or partitions 22 on their trailing sides leaves the vent pipes 34 and until these same walls or partitions 22 leave the lowermost series 40 of the steam pipes.

By subjecting the fruit or vegetables in each compartment 23 to steam of the pressure and for the length of time hereinbefore prescribed, the moisture immediately below the surface of the skin of the fruit or vegetables is raised to approximately the temperature of the surrounding steam at the prevailing pressure. When each compartment or chamber, filled with steam and with the vegetables or fruit having the temperature of the moisture beneath the skin thereof raised to a corresponding high temperature, is brought into the zone of action of the water sprays from the spray pipes 44, the steam in the chamber is immediately condensed and the pressure in the chamber immediately reduced to a vacuum. At this reduced pressure the subcutaneous moisture in the vegetables or fruit immediately vaporizes and blows or explodes the skin off the bodies of the vegetables or fruit. The skin so blown off carrots, potatoes, rutabagas, beets, onions, turnips and tomatoes and apples is very thin as compared with the body thereof and is blown off in large pieces which adhere to adjacent peeled bodies but which is readily freed. In the case of carrots, the removed skin includes that part of the skin which contains deep creases, and in the case of potatoes it includes the eyes. Vegetables and fruit peeled according to the present invention are satisfactorily peeled for all canning or preserving purposes and are in acceptable condition for preserving whole, in segments, diced, or in any other form.

After the peeling is so effected, the openings 28 from each pair of compartments 23 come into register with the discharge opening 16. When this occurs, the entire batch of peeled fruit or vegetables, with the removed skins loosely adhering thereto, fall by gravity from this pair of chambers 23 and out through the discharge duct 19.

Conditions of time and temperature must be observed both with respect to the particular kind of vegetable or fruit being peeled and also with respect to the degree of freshness of the vegetable. With vegetables which are freshly harvested the time of treatment is substantially the same for all vegetables above enumerated. However, entirely different conditions of steam pressure during treatment must be maintained. With the enumerated vegetables which are peeled after having been stored for a period of time, some require greater time of steam treatment, some require treatment at high steam pressures and some require both. The following is a table of the optimum time of steam treatment and steam pressure employed with the different vegetables enumerated when freshly dug, when peeled one week after harvest and when peeled after six months storage. The steam pressures referred to are gage pressures.

| Vegetable | Fresh | | One week after harvest | | After 6 months' storage | |
| --- | --- | --- | --- | --- | --- | --- |
| | Time in seconds | Steam Pressure | Time in seconds | Steam Pressure | Time in seconds | Steam Pressure |
| Onions | 6 | 50 | 6 | 60 | 6 | 80 |
| Carrots | 6 | 60 | 8 | 60 | 8 | 80 |
| Potatoes | 6 | 40 | 8 | 40 | 8 | 80 |
| Turnips | 6 | 80 | 6 | 80 | 10 | 80 |
| Rutabagas | 6 | 80 | 6 | 80 | 10 | 80 |
| Beets | 6 | 80 | 6 | 80 | 10 | 80 |

With apples the time of treatment is in the order of five seconds, with the steam pressure in the range of some 90–100 pounds gage, the pressure employed in this range, being determined by the maturity and texture of the apples as well as the length of time the apples have been held in storage after harvest.

By peeling the enumerated vegetables or fruit, such as apples, a substantial saving is effected due to the elimination of the waste of the body of these vegetables or fruit which is incident to mechanical peeling. Thus, the peeling loss is less than 6% as compared with peeling losses of from 20-26% for previous abrasive or mechanical methods.

I have further discovered that root vegetables or solid bodied, firm skinned fruit, peeled with the present apparatus are highly resistant to discoloration on exposure to the air. Particularly with potatoes and apples, fruit and vegetables peeled by friction, knife or mechanical means, are rapidly discolored on brief exposure to ordinary atmospheric conditions existing within the canning factory room area. This discoloration is due to the oxidation of the freshly cut tissue, such pigmentation being due to the presence of oxidative ferments or enzymes in the tissue. The enumerated vegetables and fruit, such as apples, when peeled in the present apparatus, are not subject to such discoloration on exposure to the atmosphere. For example, several varieties of apples have been peeled in accordance with the present invention and then exposed to the ordinary atmosphere of the cannery. The peeled apples so exposed have withstood the discoloration so characteristic of this fruit for a period of four days. At the time these peeled apples were discarded they were not discolored but were withered and in some instances were sour due to bacterial action. The same resistance to pigmentation due to oxidation has been noted for potatoes and other of the enumerated vegetables.

A specific feature of the present invention resides in the rotation of the rotor about a horizontal axis so that the filled compartments or chambers 23 are inverted in passing from the intake opening 15 to the discharge opening 16, particularly while passing the steam pipes 35, 38 and 40. With such inversion of these chambers the fruit or vegetables therein are tumbled around to a substantial degree. Hence, if two bodies of the fruits or vegetables have been in contact with each other during the first part of the steam treatment, at a certain spot, the tumbling of the fruit or vegetables breaks this contact and insures that these two spots are brought up to the temperature necessary to provide the desired elevated temperature of the subcutaneous moisture thereunder. Hence, when a vacuum is created by the water sprays 43, the skin is exploded from each body in its entirety and no unpeeled portions are left as spots which were not brought up to the necessary temperature because of the contact with adjacent bodies. By insuring the removal of the entire skin from each body of fruit or vegetables, close inspection of the peeled product is unnecessary and it is further unnecessary to undertake hand peeling of those spots from which the skin was not removed because of such continued contact of the bodies of the fruit or vegetables during the steam treatment.

From the foregoing it will be seen that the present invention provides a marked economy in the cost of canning or preserving vegetables, such as onions, carrots, potatoes, turnips, rutabagas, tomatoes and beets, as well as fruit such as apples, in that only the relatively thin skin of these vegetables and fruit is removed and the entire body of the vegetable or fruit retained. Further, with the apparatus shown, the complete removal of the entire skin is insured, thereby to avoid the necessity for subsequent close inspection and hand peeling of spots from which the skin is not removed. Further, with the present invention and apparatus the peeling is rapid, free from operating difficulties is effected as a substantially continuous process, and leaves the vegetables or fruit in an attractive and edible form, highly resistant to oxidation of its enzymes, and ready for any desired further processing, all eyes and deep creases in particular being removed.

I claim:

1. Apparatus for peeling the bodies of vegetables and fruit, comprising a rotor having longitudinal, generally radially extending partitions forming a plurality of chambers in annular arrangement about the axis of said rotor and opening to the periphery thereof, a stationary structure fitted against the periphery of said rotor and adapted to enclose said chambers, said structure being provided with annularly spaced intake and discharge openings for said bodies and adapted to register successively with said chambers, steam inlet means leading to the interior of said structure and arranged intermediate said intake and discharge openings, means arranged to supply steam under pressure to said steam inlet means, water spray means leading to the interior of said structure and arranged intermediate said steam inlet means and said discharge opening, means arranged to supply cold water under pressure to said water spray means, and a curved wall extending laterally from the outer extremity of each of said partitions on the trailing side thereof and engaging the internal surface of said structure and arranged to close and uncover operatively said steam inlet and water spray means during rotation of said rotor whereby each of said chambers successively receives an admission of steam under pressure to raise the temperature of the subcutaneous moisture of the said bodies therein to approximately the temperature of said steam, followed by an admission of cold water to condense said steam and create a vacuum in said chamber to vaporize said subcutaneous moisture and to explode the skins from said bodies.

2. Apparatus for peeling the bodies of vegetables and fruit, comprising a cylindrical rotor mounted for rotation about a generally horizontal axis and comprising end disks and longitudinal, generally radially extending partitions connecting said end disks and forming a plurality of chambers in annular arrangement about the axis of said rotor and opening to the periphery thereof, a stationary cylinder enclosing said cylindrical rotor and fitting the periphery thereof, said stationary cylinder being provided on one side of its upper half with an intake opening adapted to register successively with said chambers to admit a quantity of bodies therein, said stationary cylinder being provided in its lower half and directly below said intake opening with a discharge opening through which said bodies fall from said chambers by gravity, steam inlet means leading to the interior of said stationary cylinder and arranged intermediate said intake and discharge openings, means arranged to supply steam under pressure to said steam inlet means, water spray means leading to the interior of said stationary cylinder and arranged intermediate said steam inlet means and said discharge opening, means arranged to supply cold water under pressure to said water spray means, and a curved wall concentric with the axis of said cylindrical rotor and extending laterally from the outer extremity of each of said partitions on the trailing side thereof and terminating short of the adjacent one of said partitions, the outer surfaces of said curved walls and end disks forming the peripheral surface of said cylindrical rotor, said curved walls being arranged to close and uncover operatively said steam inlet and water spray means during rotation of said cylindrical rotor whereby each of said chambers successively receives an admission of steam under pressure to raise the temperature of the subcutaneous moisture of the said bodies therein to approximately the temperature of said steam, followed by an admission of cold water to condense said steam and create a vacuum in said chamber to vaporize said subcutaneous moisture and to explode the skins from said bodies.

3. Apparatus for peeling the bodies of vegetables and fruit, comprising a cylindrical rotor mounted for rotation about a generally horizontal axis and comprising end disks and longitudinal, generally radially extending partitions connecting said end disks and forming a plurality of chambers in annular arrangement about the axis of said rotor and opening to the periphery thereof, a stationary cylinder enclosing said cylindrical rotor and fitting the periphery thereof, said stationary cylinder being provided on one side of its upper half with an intake opening adapted to register successively with said chambers to admit a quantity of bodies therein, said stationary cylinder being provided in its lower half and directly below said intake opening with a discharge opening through which said bodies fall from said chambers by gravity, steam inlet means leading to the interior of said stationary cylinder and arranged intermediate said intake and discharge openings, means arranged to supply steam under pressure to said steam inlet means, water spray means leading to the interior of said stationary cylinder and arranged intermediate said steam inlet means and said discharge opening, means arranged to supply cold water under pressure to said water spray means, said stationary cylinder being provided with a vent opening leading to the interior thereof and arranged intermediate said intake opening and steam inlet means, and a curved wall concentric with the axis of said cylindrical rotor and extending laterally from the outer extremity of each of said partitions on the trailing side thereof and terminating short of the adjacent one of said partitions, the outer surfaces of said curved walls and end disks forming the peripheral surface of said cylindrical rotor, said curved walls being arranged to close and uncover operatively said vent opening, said steam inlet and water spray means during rotation of said cylindrical rotor whereby each of said chambers successively receives an admission of steam under pressure to raise the temperature of the subcutaneous moisture of the said bodies therein to approximately the temperature of said steam, followed by an admission of cold water to condense said steam and create a vacuum in said chamber to vaporize said subcutaneous moisture and to explode the skins from said bodies.

4. Apparatus for peeling the bodies of vegetables and fruit, comprising a cylindrical rotor mounted for rotation about a generally horizontal axis and comprising end disks and longitudinal, generally radially extending partitions connecting said end disks and forming a plurality of chambers in annular arrangement about the axis of said rotor and opening to the periphery thereof, a stationary cylinder enclosing said cylindrical rotor and fitting the periphery thereof, said stationary cylinder being provided on one side of its upper half with an intake opening adapted to register successively with said chambers to admit a quantity of bodies therein, said stationary cylinder being provided in its lower half and directly below said intake opening with a discharge opening through which said bodies fall from said chambers by gravity, steam inlet means leading to the interior of said stationary cylinder and arranged intermediate said intake and discharge openings, means arranged to supply steam under pressure to said steam inlet means, water spray means leading to the interior of said stationary cylinder and arranged intermediate said steam inlet means and said discharge opening, means arranged to supply cold water under pressure to said water spray means, and a curved wall concentric with the axis of said cylindrical rotor and extending laterally from the outer extremity of each of said partitions on the trailing side thereof and terminating short of the adjacent one of said partitions, the outer surfaces of said curved walls and end disks forming the peripheral surface of said cylindrical rotor, said steam inlet means being of greater circumferential extent than each of said curved walls, said curved walls being arranged to close and uncover operatively said steam inlet and water spray means during rotation of said cylindrical rotor whereby each of said chambers successively receives an admission of steam under pressure to raise the temperature of the subcutaneous moisture of the said bodies therein to approximately the temperature of said steam, followed by an admission of cold water to condense said steam and create a vacuum in said chamber to vaporize said subcutaneous moisture and to explode the skins from said bodies.

RUSSELL H. WINTERS.

REFERENCES CITED

The following references are of record in the file of this patent:

UNITED STATES PATENTS

| Number | Name | Date |
|---|---|---|
| 1,445,742 | Blair | Feb. 20, 1923 |
| 1,910,749 | Chapman | May 23, 1933 |
| 1,976,801 | Nicholoy | Oct. 16, 1934 |
| 2,360,983 | Scarff | Oct. 24, 1944 |